J. L. Tuttle.
Picker for Looms.
N° 6,840.    Patented Oct. 30, 1849.

UNITED STATES PATENT OFFICE.

JOHN L. TUTTLE, OF LAWRENCE, MASSACHUSETTS.

IMPROVEMENT IN THE MODE OF MAKING TOOTHED CYLINDERS.

Specification forming part of Letters Patent No. 6,840, dated October 30, 1849.

*To all whom it may concern:*

Be it known that I, JOHN L. TUTTLE, of Lawrence, in the county of Essex and State of Massachusetts, have invented a new and useful improvement in the process of manufacturing cylinders for either picking, cleaning, or carding wool or such other fibrous substances to which the same may be applicable; and I do hereby declare that the same is fully described and represented in the following specification and accompanying drawings, letters, figures, and references thereof.

Figure 1:
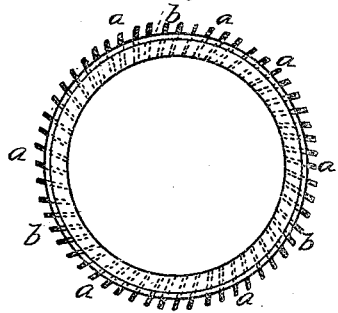
Figure 3:
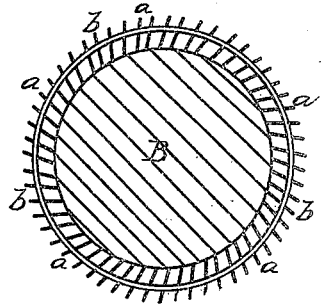
Figure 5:
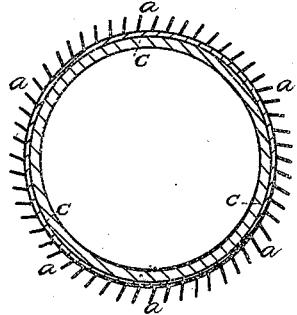
Figure 2:
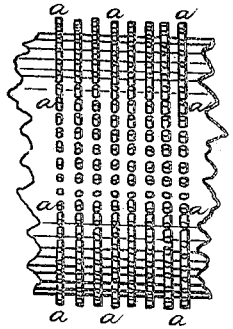
Figure 4:
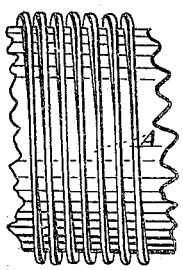

Of the said drawings, Figure 1 denotes an end view of a section of one of my improved cylinders. Fig. 2 is a side view of it. Fig. 3 is an end view of the teeth and their holding material or tube as arranged about the cylinder or mandrel, between which and the said tube or holding material and around the roots of the teeth melted metal is poured in order to confine the teeth in place, as will be hereinafter described. Fig. 4 is a side view of the screw-mandrel for holding the paper or metallic tube while the teeth are being set. Fig. 5 will be hereinafter described.

In the process of making my improved tooth-cylinders or sections thereof I take a screw, A, Fig. 4, of any suitable diameter and length and wind around the exterior cylindrical surface of its threads a roll, sheet, or band of paper or other suitable flexible material covered with paste or composition, which will cause the successive layers to adhere together and form a tube about or inclosing the screw. This being done and the paper having become sufficiently dry, I puncture the said tube of paper or make holes through it over the spaces between the turns of the screw, these holes being made at suitable distances apart and each at such an angle to the external surface of the paper tube as may be desirable. Into each of the said holes I insert one of the teeth or wires *a a*, &c., of the whole series to be applied to the section or part of the toothed cylinder to be made, it being understood that the hole which receives the tooth is to be small enough to finally hold it in position during the subsequent operations to be hereinafter described. As to any method of making such hole or holes and inserting the tooth or teeth in it or them, the same may be accomplished by hand or by means of a machine properly made and adapted to perform the same. Each tooth should be made to extend entirely through the paper tube *b*, Fig. 3, and so far beyond its inner surface as to rest on the external surface of the cylinder on which the screw-thread is formed; or, in other words, each tooth should project beyond the inner surface of the tube and within the tube a sufficient distance to insure to it a proper bearing within the metal to be cast around it. The paper tube being thus studded with teeth, I next lay hold of the tube and teeth with one hand, while with the other I revolve the screw A in such manner as to cause it to unscrew and remove itself from the tube and teeth. Next I insert within the tube *b* a cylinder or mandrel, B, Fig. 3, of a suitable size and diameter to enter the tube. It may be of a diameter to have its external surface in contact with the inner ends of the several teeth, or it may be made of a less diameter. I next, after properly stopping up the space between the tube *b* and the external curved surface of the said cylinder, pour into the said space some suitable metal or composition of metals in a molten state, and which will set or become hard when cooled, and I do the same so as to cause it to fill the entire space and completely insinuate itself between the roots or parts of the teeth which project within the tube. As a general rule it is best to make the teeth of tinned wire—that is, metallic or steel wire covered with a coating of tin or some other suitable metal which will readily combine with or adhere to the wire and the molten metal to be poured around the roots of the teeth.

I would here remark that in some cases the mandrel B may be dispensed with—that is to say, when I may desire to fill the entire space within the tube with the melted metal, and thus make a solid cylinder of the metal when cold, instead of a mere tube to be afterward fitted upon a shaft or mandrel.

When the metal has become set or in a cold state, the mandrel may be removed from it. The paper tube may next be cut and stripped from the teeth, so as to leave them projecting above the outer surface of the metal in which they are embedded.

Instead of the paper tube, which can be conveniently removed from the teeth, as described, I sometimes use a copper or metallic tube, c, Fig. 5, made of proper size to fit over and upon the outer cylindrical surface of the screw A. This metallic tube may be punctured and studded with the teeth in the same manner as I have hereinbefore explained with respect to the paper tube, except that the teeth are to be made to project beyond its outer curved surface the same distance that they would beyond the tube of metal cast within the paper, or from the same after the paper has been peeled or removed from it, as before described. The screw should be of a proper size to fit the interior of the tube—that is to say, its external diameter should be equal to the internal diameter of the tube. The tube c and its teeth being thus prepared are next to be removed from the screw, which may be done by unscrewing it therefrom. A mandrel or core being inserted or not within the interior of the metallic tube, as before described with respect to the paper tube, the molten metal is poured into the space surrounding the roots of the teeth, and when cold secures them in place. Several short cylinders so made may be placed or arranged on one common axis or hollow shaft in order to constitute a cylinder of any desirable length. Teeth so set are for many purposes far superior and preferable to those set in leather.

I am aware that teeth have been fixed in solid blocks or cylinders of metal, and by boring holes in said cylinders and inserting and confining the teeth therein. Besides the difficulty of keeping the teeth in their proper places when so applied, such a method of making a cylinder of teeth becomes very expensive in comparison to that adopted by me. I am also aware that lead or other fluid metal or material in a molten or liquid state has been cast around one or more articles for the purpose of holding them in place. I do not, therefore, lay any claim to such modes or contrivances in the abstract; but What I do claim as my invention is—

The improvement in the mode of setting and adjusting the teeth of toothed cylinders made substantially as hereinbefore described, the said improvement consisting in the employment of the screw A, in combination with the external tube of paper or metal, b, the said screw not only enabling me to set the teeth in a helix line, which presents great advantages in their operation, but to readily withdraw it (the screw) at the proper time and for the introduction of the cylinder B, as described.

In testimony whereof I have hereto set my signature this 17th day of August, A. D. 1849.

J. L. TUTTLE.

Witnesses:
SAMUEL HOYT,
CHS. STARK NEWELL.